United States Patent [19]

Jorde

[11] Patent Number: 4,677,881
[45] Date of Patent: Jul. 7, 1987

[54] CHAIN SAW SHARPENER

[76] Inventor: James E. Jorde, 217 E. Center St., Basalt, Id. 83218

[21] Appl. No.: 859,040

[22] Filed: May 2, 1986

[51] Int. Cl.⁴ ............................................ B23D 63/16
[52] U.S. Cl. ...................................... 76/25 A; 76/37
[58] Field of Search ................... 76/25 A, 31, 74, 36, 76/37

[56] References Cited

U.S. PATENT DOCUMENTS

| | | | |
|---|---|---|---|
| 2,770,985 | 11/1956 | Pearce | 76/37 |
| 3,744,349 | 7/1973 | Juncker | 76/25 A |
| 4,404,871 | 9/1983 | Fritz et al. | 76/25 A |

Primary Examiner—Roscoe V. Parker
Attorney, Agent, or Firm—Fitch, Even, Tabin & Flannery

[57] ABSTRACT

A chain saw sharpening device having a generally U-shaped frame defined by an upper web and first and second parallel side walls for overlying the chain and the guide bar of the chain saw. The frame includes an open area near the center of the upper web defining a sharpening area. Clamping screws are associated with the frame to secure the frame to the cutting bar and an additional clamping screw is associated with the frame for engaging the link of the tooth to be sharpened in order to fix its position with respect to the sharpening area of the frame. A tooth stop for adjusting the position of the tooth with respect to the sharpening area of the frame is mounted on a sliding block received in a keyway in the upper web of the frame, the keyway being parallel to the longitudinal axis of the channel in the cutting bar for the chain. An adjustment bolt rotatably captured with respect to the frame adjusts the position of the sliding block and tooth stop pawl along the length of the keyway to provide a precise, controlled adjustment of the location within the sharpening area of the tooth to be sharpened. A rotary burr having an abradant surface is receivable in either of two diagonally disposed guide bores for sharpening left-hand and right-hand cutting teeth.

7 Claims, 4 Drawing Figures

CHAIN SAW SHARPENER

The present invention relates to an improved device for sharpening the teeth of a chain saw and, more pariticularly, to a chain saw sharpener that permits the consecutive sharpening of left-hand and right-hand teeth and provides for the accurate, uniform sharpening of the chain saw teeth despite repeated use.

An assortment of portable devices are available for the on-site sharpening of the teeth of a chain saw. Such devices are typified by U.S. Pat. Nos. 4,404,871 and 3,744,349, in which the sharpening devices are secured to the cutter bar of the chain saw so as to overlie the chain and a removable burr is rotatable with respect to each device to sharpen the teeth of the chain.

Common problems accompany the use of these sharpening devices, principal among them being the inability to uniformly sharpen both the left-hand and right-hand teeth, and the repeated adjustment of the sharpening device in an attempt to so sharpen the chain saw teeth. Uniformity in the size and shape of the cutting teeth is essential for obtaining a straight, even cut through a workpiece. Additionally, the devices of the above-referenced patents require a relatively involved setup procedure in which a plurality of jig members must be manipulated before a person is able to use the sharpening device. Because of the numerous adjustments required to set up their devices, the settings of the sharpening devices invariably change during use, resulting in either a constant readjustment of the devices or a non-uniform sharpening of the chain saw teeth.

In use, each sharpener described in the above-referenced patents first sharpen all the teeth of a like hand (i.e., either all the left-hand teeth or all the right-hand teeth) and then the sharpener is readjusted to sharpen the teeth of the opposite hand. This requires that the jig members be repeatedly manipulated for sharpening the teeth of opposite hands. Further, the readjustment after first sharpening all the teeth of one hand often results in an undesirable variance between the teeth of the opposite hands. An additional series of relatively complicated adjustments also must be made to cut the depth gauge portions of the teeth.

The rake angle of the teeth on different makes of saw chains often varies, the rake angle typically being either 35° or 30° with respect to a reference line perpendicular to the cutting bar of the chain saw. However, the above-mentioned devices are able to sharpen the teeth of only one rake angle, thus limiting their utility.

Accordingly, it is the principal object of the present invention to provide an improved device for sharpening the teeth of a chain saw that facilitates repeated, uniform sharpening of the chain saw teeth.

More particularly, it is an object to provide a chain saw sharpening device that requires only simple adjustment of a minimal amount of moving parts in order to set up the device for sharpening of both the left-hand and right-hand teeth, as well as for the cutting of the depth gauges.

It is a further object to provide a chain saw sharpening device that facilitates the consecutive sharpening of left-hand and right-hand chain saw teeth without the need for readjustment of the device to sharpen the teeth of the opposite hand.

An additional object is to provide a chain saw sharpening device that is adaptable to sharpen chain saw teeth of different rake angles.

These objects, and others that will become apparent upon reference to the accompanying drawings and detailed description, are provided by a chain saw sharpening device having a generally U-shaped frame defined by an upper web and first and second parallel side walls for overlying the chain and the guide bar of the chain saw. The frame includes an open area near the center of the upper web defining a sharpening area. Clamp means are associated with the frame to secure the frame to the cutting bar and additional clamp means are associated with the frame for engaging the link of the tooth to be sharpened in order to fix its position with respect to the sharpening area of the frame. A tooth stop for adjusting the position of the tooth with respect to the sharpening area of the frame is mounted on a sliding block received in a keyway in the upper web of the frame, the keyway being parallel to the longitudinal axis of the channel in the cutting bar for the chain. The keyway permits a single degree of freedom for the tooth stop along the longitudinal axis of the keyway, the pawl tooth stop extending into the open sharpening area. The pawl is sufficiently wide so that a transverse surface is able to engage the outermost portion of both the right-hand and left-hand teeth. An adjustment bolt rotatably captured with respect to the frame adjusts the position of the sliding block and tooth stop pawl along the length of the keyway to provide a precise, controlled adjustment of the location within the sharpening area of the tooth to be sharpened. Removable guide means having diagonally disposed bores for receiving a sharpening burr is secured to the frame so that the bores open into the sharpening area. A rotary burr is receivable in the guide bores for sharpening the chain saw tooth and/or the depth gauge.

DETAILED DESCRIPTION OF THE PREFERRED EMBODIMENT

Figure 1:
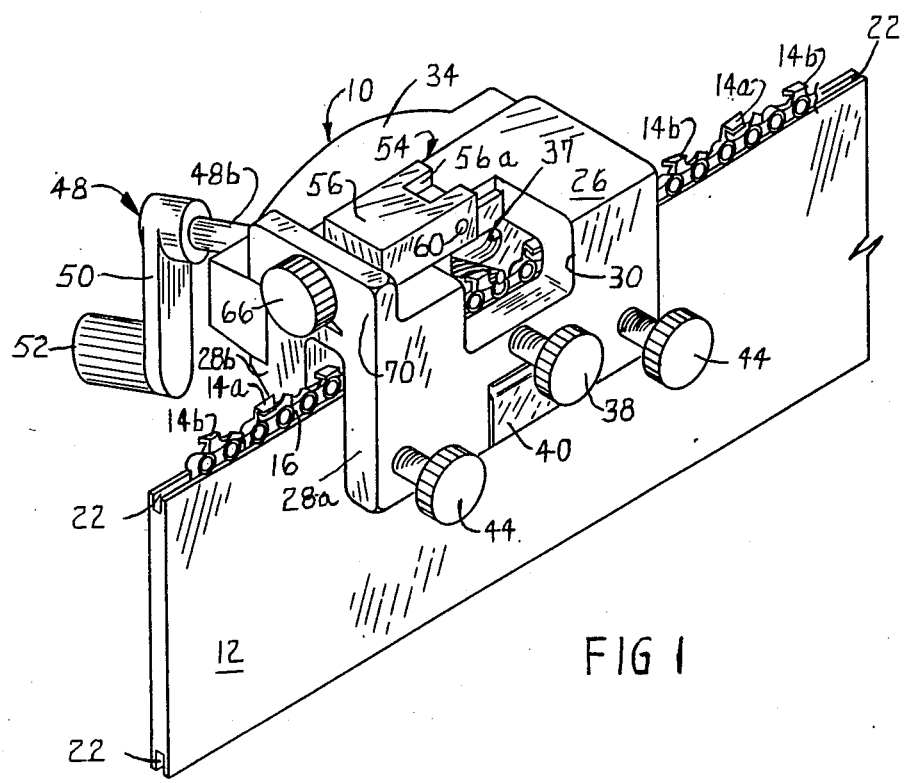
FIG. 1 is a perspective view of the chain saw sharpening device of the present invention shown in place on the guide bar of a chain saw.

Turning to the figures of the drawings, which are by way of illustration and not limitation, there is seen in FIG. 1 a chain saw sharpener generally indicated by 10, shown in place on the cutter or guide bar 12 of a chain saw (not shown) in order to sharpen the teeth 14 of a saw chain 16. The saw chain 16 is of a well known design and includes left-hand and right-hand cutting teeth 14a, 14b respectively, arranged alternately on opposite sides of the chain 16 and connected by tie straps or side links 18 to driver links 20 to form a one-piece endless chain. The driver links 20 (best seen in FIG. 3) have a projecting portion (not shown) that is received in a guide channel 22 (best seen in FIG. 1) that extends about the periphery of the guide bar 12.

Figure 4:
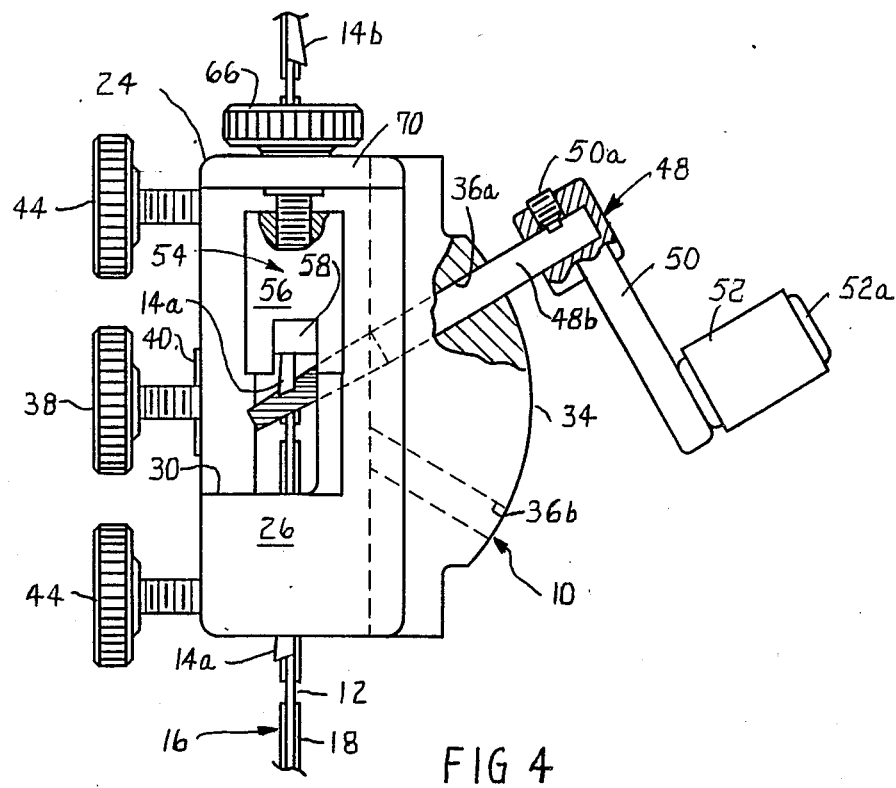
FIG. 4 is a plan view of the device of FIG. 1.

The sharpener 10 includes a generally U-shaped frame 24 having an upper web 26 connecting first and second side walls 28a, 28b, respectively. A central portion 30 of the upper web 26 and the side wall 28a is cut away to define an open area through the web 26 and side wall 28a for receiving the chain saw tooth 14 to be sharpened. The side wall 28b also has a channel 32 formed on the exterior thereof for receiving a removable burr guide, generally indicated by 34, which is secured to the side wall 28b of the frame 24 by means of bolts 34a. The guide 34 includes converging bores 36a, 36b (best seen in FIGS. 2 and 4) that open into a slot 37 in the side wall 28b to provide the bores 36a, 36b access to the sharpening area 30 of the frame 24. The bores 36a, 36b are symmetrically inclined about a line perpendicular to the guide bar 12 and saw chain 16 at an angle substantially equal to the rake angle of the left- and right-hand teeth 14b, 14a of the saw chain 16.

To securely position a tooth 14 of the saw chain 16 within the open sharpening area 30 of the frame 24, a clamping screw 38 is received within an internally-threaded bore 38a (FIG. 2) in the side wall 28a disposed adjacent the opening 30. The clamping screw 38 acts on a U-shaped spring clip 40 formed with a ridge 40a on the shorter, outside leg thereof. The ridge 40a is received in a channel 42 (best seen in FIG. 2) on the outer surface of the side wall 28a to maintain the spring clip 40 in alignment with the clamping screw 38. The spring clamp 40 serves to maintain the perpendicular alignment of left-hand teeth 14b during sharpening. Perpendicular alignment of right-hand teeth 14a is maintained by their contact during sharpening with the side wall 28a. When a tooth link 14 is positioned within the opening 30, the clamp screw 38 is adjusted to hold the link 14 in place.

To securely hold the sharpener 10 onto the guide bar 12 of the chain saw, the frame 24 is supplied with additional clamping screws 44 received in threaded bores 44a (best seen in FIG. 2) in the lower, outer portions of the side wall 28a. The ends of the screws 44 are cupped (as opposed to being flat or rounded) in order to provide increased holding power between the screws 44 and the guide bar 12. When the sharpener 10 is positioned over the guide bar 12, the clamping screws 44 are tightened to hold the guide bar against the shoulder 46 on the lower interior portion of the side wall 28b to prevent relative motion between the sharpener 10 and the guide bar 12.

With a tooth link 14 properly aligned within the sharpening area 30 and the sharpener 10 clamped onto the guide bar 12, the tooth 14 is sharpened by means of a rotary cutter or burr, generally indicated by 48, that is inserted into either of the two converging bores 36a, 36b in the burr guide 34, depending upon whether the link 14 to be sharpened is in the form of a left-hand or right-hand tooth. The rotary burr 48 is preferably made of a high-impact carbide material that is highly chip-resistant and has a conically-shaped, spiral, abradant cutting surface 48a bonded to a smooth shaft portion 48b. The shaft portion 48b is sized in diameter to be slightly less than the inside diameter of the converging bores 36a, 36b so as to provide the accurate rotation of the rotary burr 48 about the axis of either of the bores 36. A crank member 50 is secured to the shaft portion 48b of the burr 48 by means of a set screw 50a and a freely-rotatable handle 52 is secured to the crank member 50 by a pin member 52a so as to facilitate the easy manual rotation of the burr 48 when it is located in either of the guide bores 36a, 36b.

In keeping with the invention, means are provided for accurately positioning the tooth links 14 within the opening 30 of the sharpener 10 so as to repeatedly and precisely position subsequently-sharpened teeth within the opening, resulting in that all the teeth will be sharpened to the same extent and length. Such uniformity in size of the sharpened teeth ensures a straight, even cut through a workpiece, eliminating chain tooth radius cutting. To this end, a tooth stop, generally indicated by 54, is movably secured to the frame 24 of the sharpener 10 so as to engage the rearmost portion of a tooth link 14, whether a left-hand or right-hand tooth, to position each such tooth link at the same position within the opening 30 in the frame 24 with respect to the rotary burr 48.

The tooth stop 54 comprises a pawl-support block 56 having a forked end 56a (best seen in FIG. 2) to which a pawl member 58 is pivotally mounted by a pin 60 so that the pawl 58 is able to pivot out away from the support block 56 (i.e., in a counterclockwise direction as viewed in FIG. 3), but abuts the support block 56 so that the pawl 58 cannot pivot in toward the support block 56 (i.e., clockwise as viewed in FIG. 3) past an angle substantially perpendicular to the support block 56.

Integral with the support block 56 is a slide member 62 that interfits with an undercut slot 64 in the upper surface of the web portion 26 of the sharpener frame 24. As illustrated, the slide member 62 is in the form of a dovetail tenon and the slot 64 is in the complementary form of a dovetail mortise, the undercut slot 64 extending between the open central sharpening area 30 of the sharpener 10 and one end thereof. The slide member 62 and undercut slot 64 are manufactured to close tolerances so that any movement of the support block 56 other than along the slot 64 is substantially eliminated, i.e., the support block 56 has only a single degree of freedom along the length of the slot 64 and will not move up and down or angularly with respect to a vertical axis through the slot.

Figure 2:
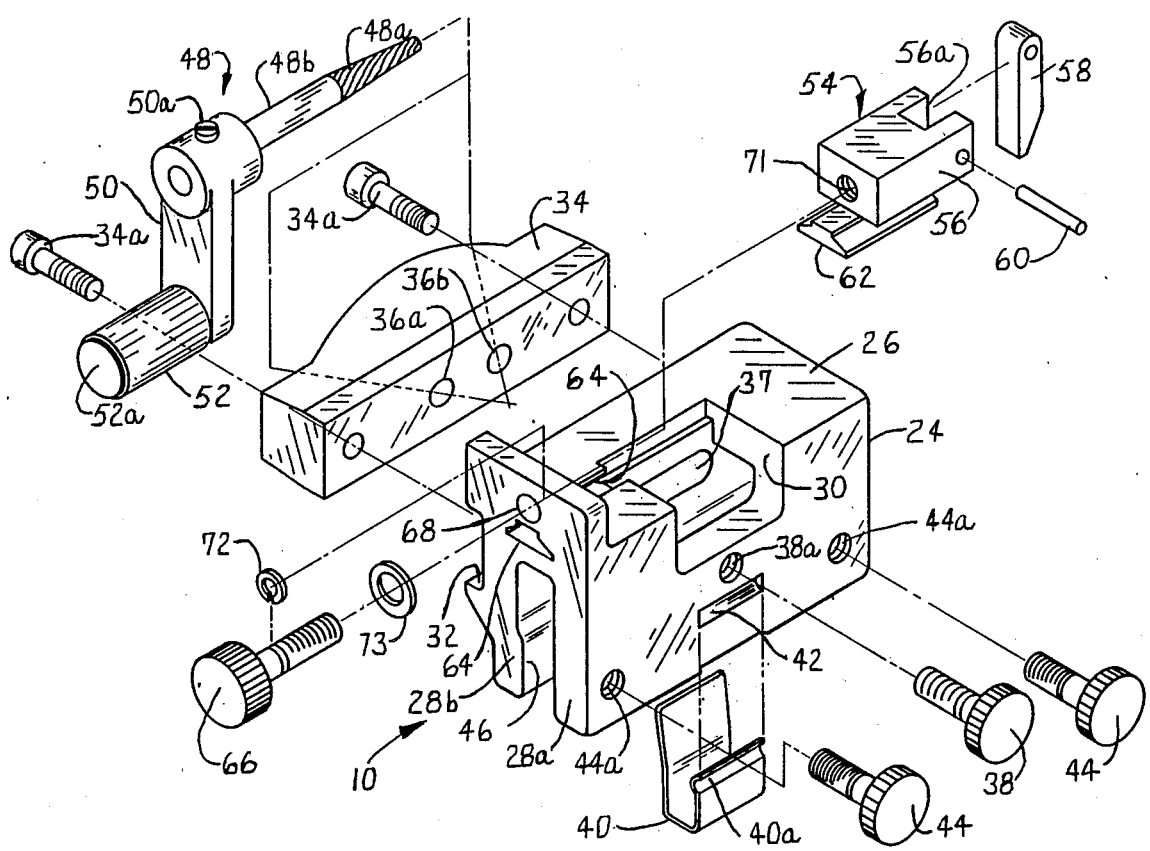
FIG. 2 is an exploded perspective view of the device of FIG. 1.

In order to precisely position the support block 56 along the length of the undercut slot 64 (and, consequently, precisely locate the pawl member 58 within the opening 30) a threaded adjustment bolt 66 is captured within a bore 68 in an upstanding shoulder or bracket member 70 that is integral with the upper web 26 of the sharpener frame 24 at the outer end of the undercut slot 64 (best seen in FIG. 2). The threaded portion of the bolt 66 is received in an internally threaded bore 71 (FIG. 2) in the support block 56 so that, upon rotation of the bolt 66, the threaded portion will be advanced into or retracted from the threaded bore 71 so as to slide the tooth stop 54 along the undercut slot 64. Depending upon the pitch of the screw thread and the number of threads per inch, extremely fine adjustment of the position of the tooth stop pawl 58 can be obtained by manipulating the adjustment bolt 66. The smooth portion of the shaft of the adjustment bolt 66 is maintained within the aperture 68 in the upstanding shoulder 70 by means of a retaining ring 72 and thrust washer 73 disposed on the shaft on opposite sides of the shoulder 70. Alternatively, the smooth surface of the shaft of the adjustment bolt 66 could have a circumferential groove that seats a pin extending into the bore 68 in the shoulder member 70, thus maintaining the position of the adjustment bolt 66 with respect to the shoulder 70 while still permitting rotation of the bolt. Both methods of capturing the adjustment bolt 66 within the aperture 68 provide a sufficient hinderance to rotation of the bolt 66 so that unintended movement of the bolt is prevented. Accordingly, the combination of the interfitting slide member 62 and undercut slot 64 with the captured adjustment bolt 66 decreases any possibility that the tooth stop pawl 58 will be shifted or bumped out of position during the sharpening operation, thus ensuring that all teeth 14 will be positioned within the opening 30 in substantially the same location.

Figure 3:
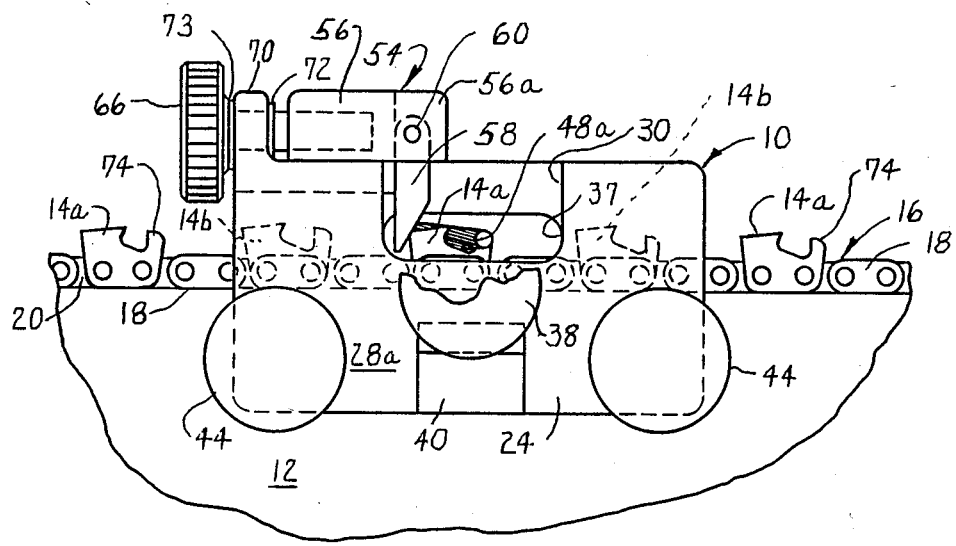
FIG. 3 is a front elevation of the device of FIG. 1 shown in place on the guide bar of the chain saw.

To use the sharpener 10 for accurate sharpening of the chain saw teeth 14, the frame 24 is initially placed over the guide bar 12 of the chain saw with the rotary burr 48 fully inserted into a guide bore 36 and engaging the cutting portion of a tooth 14 that has the same rake angle as the guide bore 36 containing the burr 48. The frame 24 is then positioned to be parallel to the guide bar 12 and the clamping screws 44 are securely tightened against the guide bar 12 to maintain the relative positions of the sharpener 10 and guide bar 12. The tooth stop pawl adjustment bolt 66 is rotated to move the tooth stop 54 along the undercut slot 64 until the pawl member 58 abuts the rearmost portion of the tooth 14 that is to be sharpened to position the tooth 14 snugly against the rotary burr 48. The rotary burr 48 is then removed from the guide bore 36 and the adjustment bolt 66 is rotated a predetermined fraction of a revolution to advance the tooth stop pawl 58 (and thus the tooth 14 to be sharpened) across the opening 30 in the sharpener into a part of the area vacated by the rotary burr 48. This sets the depth of cut for the burr 48. With the rearmost portion of the tooth 14 still firmly abutting the tooth stop pawl 58, the clamping screw 38 is advanced so as to force the spring clip 40 into light engagement with the tooth 14, thus maintaining the position of the tooth 14 relative to the sharpener 10. No further adjustment of the screw 38 is necessary. The rotary burr 48 is then reinserted into the appropriate guide bore 36 until contact with the tooth 14 is established, upon which the burr 48 is rotated in a clockwise direction (as seen in FIGS. 1 and 3) while fully inserting the burr 48 into the guide bore 36 to completely sharpen the tooth. The burr 48 is then withdrawn from the guide bore 36, and the chain 16 is advanced to move the adjacent tooth in the chain (which is of the opposite hand) underneath the pawl member 58. The pawl member 58 is pivoted in a counterclockwise direction (as seen in FIG. 3) as the next tooth 14 passes thereunder into the sharpening area 30. Once the tooth 14 passes the pawl 58 and the pawl 58 pivots back to its substantially vertical position, the chain 16 is moved in the opposite direction to abut the rearmost portion of the tooth 14 firmly against the tooth stop pawl 58. Thus, the subsequently-introduced tooth 14 is positioned in the sharpening area 30 in the identical location as the previously-sharpened tooth 14. The rotary burr 48 is inserted into the alternate guide bore 36 to sharpen the tooth. The foregoing process is repeated, the rotary burr 48 alternating between bore guides 36a and 36b depending upon the hand of the tooth to be sharpened, until all the teeth 14 are sharpened.

A particular advantage of the present invention is that it permits the uniform sharpening of both left- and right-hand teeth without the need for repositioning the tooth stop pawl. This has been a particular problem with other sharpeners due to the asymmetry of the teeth 14 with respect to the center line of the saw chain 16. In order to ensure that successively sharpened left-hand and right-hand teeth are identically positioned within the sharpening area, the pawl member 58 of the tooth stop 54 is sized in width so that it extends transversely to the guide bar 12 beyond the outermost projecting portion of both the left- and right-hand teeth 14a and 14b in the saw chain 16. Thus, the tooth stop pawl will always be in a position to abut the rearmost portion of each tooth regardless of its hand, ensuring that the distance between the rearmost point and the rotary burr 48 is the same for all teeth.

After the teeth 14 in the saw chain 16 have been sharpened three or four times, the depth gauge or raker portion of each tooth (best seen in FIG. 3 and indicated by 74) may need to be adjusted. The height of the raker 74 determines the depth of the cut and, if the height of the depth gauge is less than approximately 0.025 in. less than the height of its associated tooth, the depth gauge 74 should be cut to ensure that the tooth 14 will have cutting engagement with the surface of the workpiece. To adjust the sharpener 10 for depth gauge cutting, the sharpener 10 is placed over the guide bar 12 with the downward hanging pawl member 58 resting on top of one of the teeth 14. The clamping screw 44 at the end of the sharpener 10 adjacent the tooth stop 54 is tightened and the other end of the sharpener 10 is adjusted so that the sharpener is parallel to the guide bar 10. The other clamping screw 44 is then tightened to fix the location of the sharpener 10 parallel to and spaced above the guide bar 12. In order to ensure that an adequate height difference is provided between the top of the cutting tooth and the depth gauge, the lowermost extent of the burr 48 (when fully inserted into the guide bore 36a) should extend approximately 0.035 inches lower than the lowermost extent of the tooth stop pawl 58. The rotary burr 48 is rotated while the depth gauge portion 74 of the tooth 14 is drawn underneath the burr 48 in a direction from right to left (when viewed in FIG. 3). After the depth gauge 74 is cut, the rotary burr 48 is withdrawn from the guide bore 36a a sufficient distance to allow the next tooth 14 to pass the rotary burr as the chain 16 is moved to the left (as when viewed in FIG. 3) to position the next tooth 14 in the sharpening area 30 for cutting the depth gauge 74. The depth gauge 74 of each subsequently-introduced tooth is then cut in the manner discussed above. By repeating such steps, all the depth gauges 74 are cut to the same height.

As previously noted, the rake angle of the teeth of various chains is not standardized. Thus, in the past an assortment of sharpeners have been required in order to assure that the angle of the guide bores in the burr guide match the rake angle of the teeth on the chain saw that is to be sharpened. In keeping with the invention, the burr guide 34 is removably secured to the frame 24 of the sharpener 10 by means of bolts 34a. Thus, the sharpener 10 can receive additional burr guides 34 that have a variety of different rake angles for the converging bores 36a, 36b, in order to sharpen chains of various rake angles.

From the foregoing, it can be seen that a chain saw sharpener has been provided that fully meets the objects of the invention. While the chain saw sharpener has been described in terms of a preferred embodiment, there is no intent to limit the invention to the same but, rather, it is intended to cover all equivalents and modifications within the scope of the appended claims.

What is claimed is:

1. A device for sharpening the cutting teeth of a chain saw while the chain is in place on the guide bar of the chain saw, the device comprising a generally U-shaped frame defined by an upper web and first and second parallel side walls for overlying the chain and guide bar of the chain saw; an open area adjacent the center of the upper web defining a sharpening area; clamp means associated with the first side wall to secure the frame to the guide bar; second clamp means associated with the side wall for lightly engaging the chain saw tooth to be sharpened in order to fix its position with respect to the sharpening area; a tooth stop pawl for adjusting the position of the tooth within the sharpening area, the tooth stop pawl being mounted in a sliding block received in a keyway in the upper web of the frame, the keyway being aligned with the guide bar of the chain saw and permitting only a single degree of freedom in the direction of the guide bar; a pawl member pivotally attached to the sliding block extending into the open sharpening area; an adjustment bolt associated with the tooth stop pawl and rotatably captured with respect to the frame for adjusting the position of the sliding block along the length of the keyway; and guide means having diagonally disposed bores associated with the second side wall and a rotary burr insertable into either of the guide bar bores for sharpening the teeth of the chain saw.

2. The combination of claim 1 wherein the pawl member of the tooth stop extends in a direction transverse to the guide bar a distance sufficient to engage the outermost portion of the teeth in the saw chain.

3. The combination of claim 1 wherein the guide means for the rotary burr is removable from the frame and the second side wall includes a channel for removably receiving the guide means.

4. The combination of claim 1 wherein the adjustment bolt is rotatably received and captured within a bore in a shoulder.

5. The combination of claim 1 wherein the keyway is in the shape of a dovetail.

6. The combination of claim 1 wherein the means for clamping the chain saw tooth in position within the sharpening area comprises a U-shaped spring clip having a longitudinal ridge therein that is received in a slot on the exterior of the first side wall.

7. The combination of claim 1 wherein the tooth stop pawl extends downwardly into the sharpening area a distance approximately 0.035 inches less than the lowermost extent of the rotary burr when the rotary burr is inserted into the guide bore.

* * * * *